P. Dickson,
Windlass.

N° 54,130.  Patented Apr. 24, 1866.

Witnesses:  Inventor:

UNITED STATES PATENT OFFICE.

PERRY DICKSON, OF JERSEY CITY, NEW JERSEY.

IMPROVEMENT IN LEVER-POWER OF WINDLASSES, &c.

Specification forming part of Letters Patent No. 54,130, dated April 24, 1866.

*To all whom it may concern:*

Be it known that I, PERRY DICKSON, of Jersey City, in the county of Hudson and State of New Jersey, have invented a new and Improved Application of Lever-Power for the Turning of Windlasses, Shafting &c.; and I do hereby declare that the following is a full, clear, and exact description thereof, which will enable those skilled in the art to make and use the same, reference being had to the accompanying drawings, forming part of this specification, in which—

Figure 1:
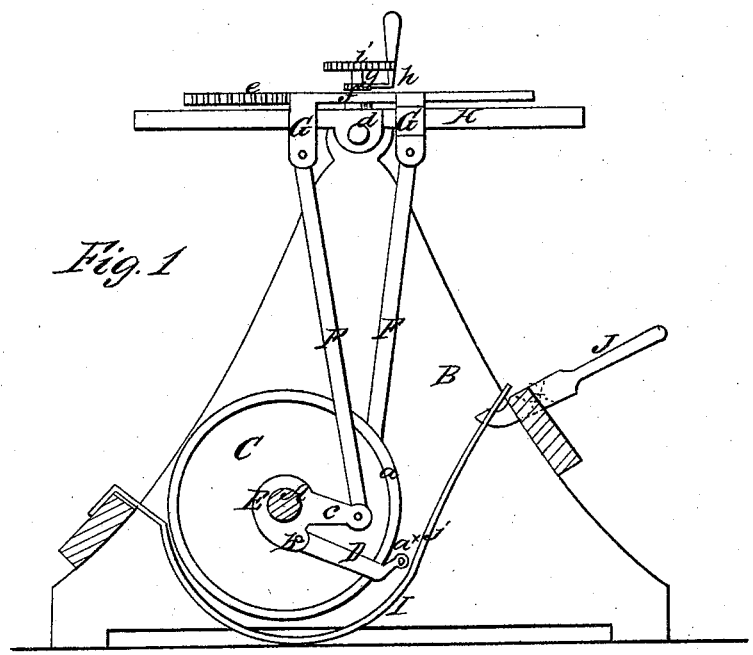
Figure 2:
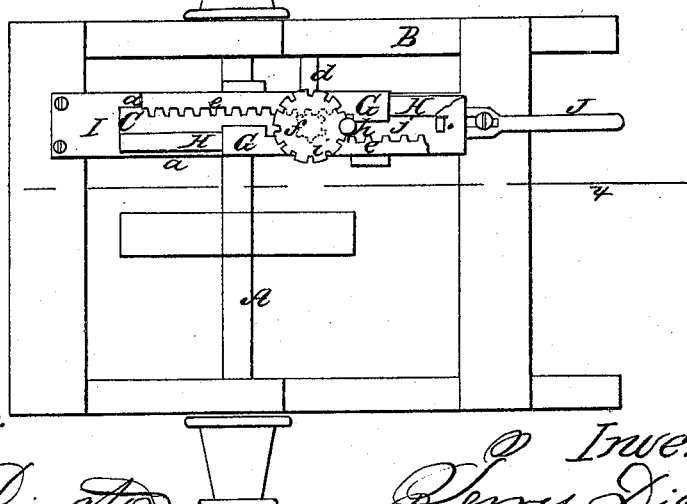

Figure 1 is a side sectional view of my invention, taken in the line $x\ x$, Fig. 2; Fig. 2, a plan or top view of the same.

Similar letters of reference indicate corresponding parts.

This invention relates to a new and useful application of lever-power for operating windlasses and turning shafting, and has for its object the varying of the lever-power, so that speed may be obtained and power sacrificed when the former and not the latter is required, and power obtained and speed sacrificed when power is required.

The invention is applicable to various purposes—ordinary windlasses, hoisting-machines, ship-windlasses, hand-cars for railroads, &c.

A represents a horizontal shaft placed within a suitable framing, B, and having a pulley, C, upon it, the periphery of which is broader or wider than the body or main portion, so as to leave a projecting flange, $a$, at each side for dogs D to act against, a dog being at each side of the pulley. These dogs are pivoted at their inner ends, as shown at $b$, to collars E, placed loosely on the shaft A and having arms $c$ projecting from them, said arms being connected by bars F to slides G G, which are placed on a lever, H, the fulcrum $d$ of which is at the upper part of the framing B. These slides G G are at opposite sides of the fulcrum $d$, and they are moved or adjusted toward or from each other by means of racks $e$ on the slides and a pinion, $f$, which gears therein, said pinion being fitted loosely on a fixed shaft, $g$, on the lever H, and having a crank, $h$, connected with it, a wheel, $i$, having a notched periphery, being secured on the upper end of shaft $g$ to hold the crank, and consequently the slides G G, in any desired position within the scope of their movement.

The dogs D D act or bind against the flanges $a\ a$ of the pulley C while rising, and, as one dog rises while the other falls, a continuous rotary motion in one direction is imparted to the shaft A by oscillating or vibrating the lever H.

The leverage power of this device, it will be seen, may be readily varied by shifting the slides G G. The nearer the latter are to the fulcrum $d$ the greater the power and slower the speed communicated to the shaft A, the reverse being the case by moving the slides from each other. Hence it will be seen that by this simple adjustment of the slides G G power is obtained when required and speed dispensed with, and speed obtained when power can be dispensed with.

This is a valuable improvement and will prove to be a great acquisition for all windlasses, hoisting-machines, and in the turning of shafting generally through the medium of lever-power. In raising heavy bodies a good leverage-power is required, and speed may be willingly dispensed with to obtain it, and when light bodies are raised power is not required, and speed may be obtained and a saving of time effected.

The same advantages are obtained when the device is used for propelling a hand-car. Heavy bodies are frequently drawn and considerable power required to propel the car along. Speed is then dispensed with, and when the car is lightly loaded the leverage is reduced and speed obtained.

I represents a brake, composed of a metal strap, $j$, one end of which is attached to the framing B and the other to a lever, J. This device, usually termed a "friction-brake," is employed in hoisting devices in order to regulate the descent of bodies, and the strap $j$ passes around the pulley C beyond the ends of the dogs D, so that when the lever J is pressed down and the strap $j$ drawn toward the periphery of the pulley C the strap will come in contact with the ends $a^x$ of the dogs D, which extend beyond the periphery of the pulley, and press them back, so that the shoulders of the dogs which bind against the flanges $a$ of the pulley C will be forced back and said pulley relieved to allow the shaft A to rotate under the weight of the raised or elevated article. This is an essential feature of the invention, for the dogs D D, when in contact with the flanges $a$ of the pulley, will not allow said pulley to rotate in a backward direction. By this arrangement the pulley is relieved simultaneously with the applying of the friction-brake.

I do not claim the dogs D D, operated by lever-power, in connection with a pulley, C, for operating windlasses, &c., for they have been previously used; but I do claim as new and desire to secure by Letters Patent—

The connecting of the dogs D of the pulley C to the lever H through the medium of slides G G, arranged as shown or in any equivalent way, so as to admit of the slides being adjusted on the lever at a greater or less distance apart, in order to vary the speed and power of the device, substantially as and for the purpose specified.

PERRY DICKSON.

Witnesses:
M. M. LIVINGSTON,
ALEX. F. ROBERTS.